(12) United States Patent
Axakov et al.

(10) Patent No.: US 7,294,793 B2
(45) Date of Patent: Nov. 13, 2007

(54) LOAD CELL MOUNTED WITH A SPRING BIASED SADDLE ELEMENT

(75) Inventors: Dmitri L. Axakov, Waterloo (CA);
Alexander M. Nassonov, Kitchener (CA); Otman A. Basir, Kitchener (CA); Fakhreddine Karray, Waterloo (CA); Sergey Krivtsov, Kitchener (CA)

(73) Assignee: Intelligent Mechatronic Systems Inc., Ontario (CA)

( * ) Notice: Subject to any disclaimer, the term of this patent is extended or adjusted under 35 U.S.C. 154(b) by 31 days.

(21) Appl. No.: 11/363,194

(22) Filed: Feb. 27, 2006

(65) Prior Publication Data

US 2006/0137916 A1 Jun. 29, 2006

Related U.S. Application Data

(63) Continuation of application No. 10/372,007, filed on Feb. 21, 2003, now Pat. No. 7,005,587.

(60) Provisional application No. 60/417,562, filed on Oct. 10, 2002, provisional application No. 60/358,640, filed on Feb. 21, 2002.

(51) Int. Cl.
*G01G 23/14* (2006.01)
*G01G 5/04* (2006.01)

(52) U.S. Cl. .................. 177/164; 73/862.627

(58) Field of Classification Search ............... 177/154, 177/164, 184, 208–209, 211, 212, 231; 73/862.584, 73/862.627, 862.632
See application file for complete search history.

(56) References Cited

U.S. PATENT DOCUMENTS

| 2,920,880 | A | * | 1/1960 | Laycock | ............... 177/211 |
|---|---|---|---|---|---|
| 2,995,034 | A | * | 8/1961 | Boiten | ............... 73/862.635 |
| 3,145,795 | A | * | 8/1964 | Tate | ............... 177/208 |
| 3,177,958 | A | * | 4/1965 | Link | ............... 177/208 |
| 3,213,400 | A | * | 10/1965 | Gieb | ............... 338/4 |
| 3,261,417 | A | * | 7/1966 | Golding | ............... 177/208 |
| 3,915,248 | A | * | 10/1975 | Paelian | ............... 177/210 R |
| 4,061,035 | A | * | 12/1977 | Witzke et al. | ............... 73/715 |
| 4,411,327 | A | * | 10/1983 | Lockery et al. | ............... 177/211 |
| 4,554,987 | A | * | 11/1985 | Dillon | ............... 177/134 |
| 4,716,979 | A | * | 1/1988 | Bradley et al. | ............... 177/208 |
| 4,744,254 | A | * | 5/1988 | Barten | ............... 73/862.622 |
| 5,600,104 | A | * | 2/1997 | McCauley et al. | ............... 177/136 |
| 5,801,339 | A | * | 9/1998 | Boult | ............... 177/261 |
| 5,971,432 | A | * | 10/1999 | Gagnon et al. | ............... 280/735 |
| 6,026,694 | A | | 2/2000 | Gray | |
| 6,089,106 | A | | 7/2000 | Patel et al. | ............... 73/862.582 |
| 6,089,109 | A | * | 7/2000 | Fujimoto | ............... 73/866.5 |
| 6,092,838 | A | | 7/2000 | Walker | |

(Continued)

FOREIGN PATENT DOCUMENTS

DE 27 35 016 A1 2/1979

*Primary Examiner*—Randy W Gibson
(74) *Attorney, Agent, or Firm*—Carlson, Gaskey & Olds

(57) ABSTRACT

A load cell includes a first element, a second element and a sensor measuring force between the first and second elements along a first axis. In some embodiments, lateral and angular decoupling is provided by the provision of a convex surface between the first and second elements. The convex surface is slidable relative to at least one of the first and second elements in a first direction perpendicular to the first axis.

12 Claims, 17 Drawing Sheets

U.S. PATENT DOCUMENTS 6,340,799 B1 * 1/2002 Hama et al. ................. 177/238
6,417,466 B2 * 7/2002 Gross et al. ................. 177/211
6,433,289 B1 * 8/2002 Gurr ........................... 177/238
6,797,892 B2 * 9/2004 Golla ........................... 177/144

* cited by examiner

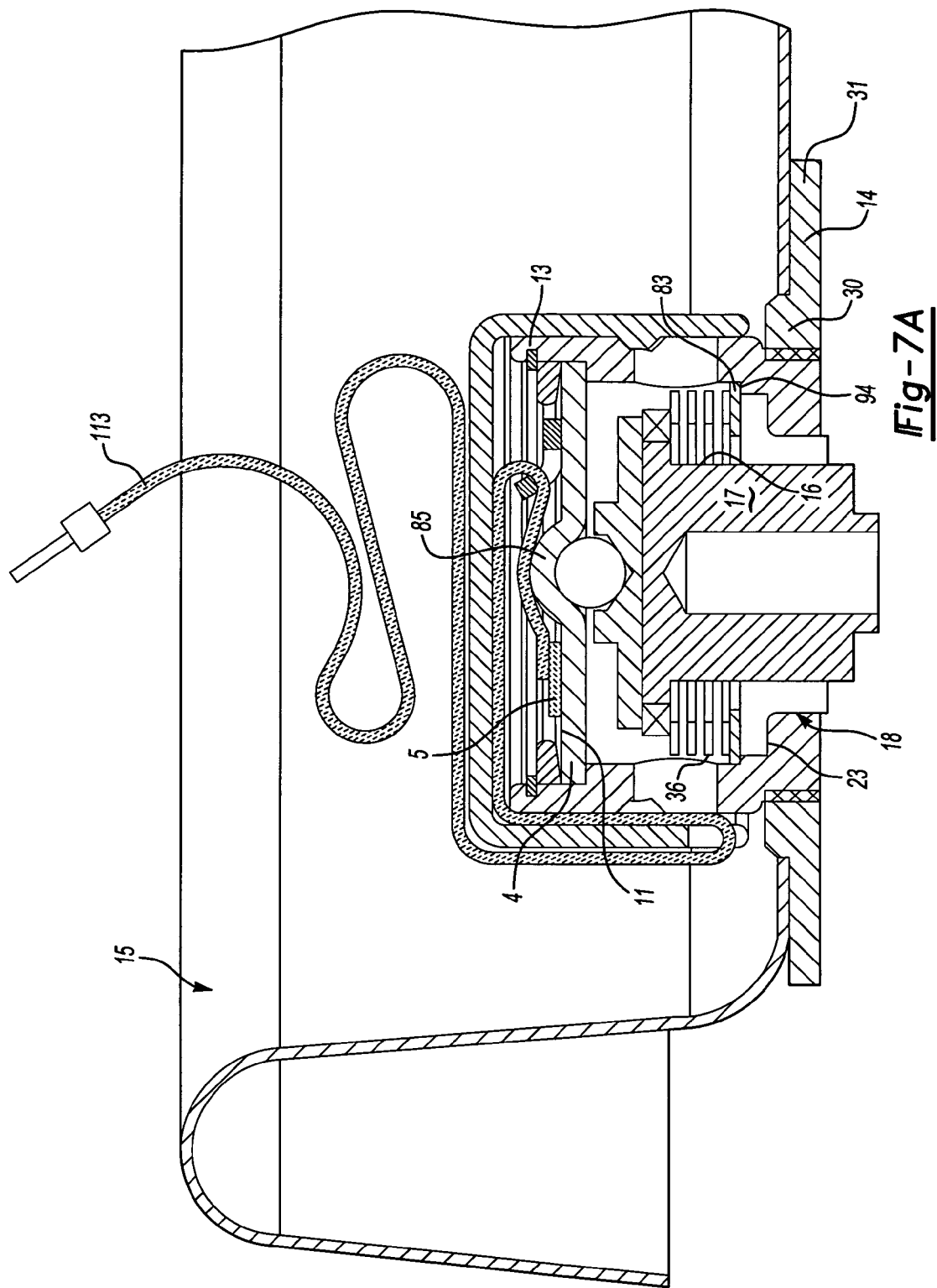

LOAD CELL MOUNTED WITH A SPRING BIASED SADDLE ELEMENT

This application is a continuation of U.S. application Ser. No. 10/372,007 filed Feb. 21, 2003 now U.S. Pat. No. 7,005,587, which claims priority to U.S. Provisional Applications Ser. Nos. 60/417,562 filed Oct. 10, 2002 and 60/358,640 filed Feb. 21, 2002.

BACKGROUND OF THE INVENTION

The present inventions relates generally to a load cell and more particularly to a load cell for determining the weight and position of an occupant of a vehicle seat.

Generally, it is often desirable to determine the weight and position of an occupant of a seat in a vehicle passenger compartment. For example, based upon the weight of the occupant and the position of the occupant on the seat, an active safety restraint system may determine whether or not to deploy or may determine the amount of force with which to deploy. Applicant has determined that one way of achieving this is by using a plurality of load cells mounted beneath the vehicle seat. However, to get an accurate determination of weight and position, lateral and angular forces on the vehicle seat should be decoupled from the measurement.

One known type of load cell is disclosed in U.S. Pat. No. 6,005,199. It includes a load shaft having a half-spherical surface at each axial end. The load shaft is disposed between an upper pressure plate and a lower pressure plate. The half-spherical surfaces permit angular displacement between the upper pressure plate and the lower pressure plate. However, this design does not provide full lateral decoupling of the upper pressure plate. Further, this design is subject to interference from friction between interacting parts that contact each other in extreme positions. The friction causes mechanical hysteresis when measuring that may result in error.

SUMMARY OF THE INVENTION

The present invention integrates an arrangement of load cells for the purpose of determining an occupant's weight and position. A force sensitive unit has a rigid mechanical connection with the upper structural part. The stud is installed rigidly on the bottom structural part. The stud has a head that is locked inside of the upper rigid element, holding the force sensitive unit. There is a gap all around the stem of the stud. The shock absorbing bushing is placed in this gap so even if lateral shift or angular misalignment exists, and corresponding loads are applied, the stud has no sufficient friction; therefore allowing the inevitable and necessary microscopic axial movements.

Generally, the force sensitive units require a specific direction of force applied at a specific point. But the lateral forces applied to the load cell result in movement of the head of the stud, so it is not recommended to have a direct mechanical contact between the stud head and the force sensitive unit.

Several embodiments of the present invention are disclosed. The simplest solution shown in this specification is having of two sliding surfaces, one or both of them being rounded with a sufficient radius to increase the mated surface area. This arrangement is the least expensive and can be acceptable for some applications but it allows for possible misalignment of a location of applied force and also allows wearing of the mated surfaces.

Other embodiments disclosed herein have two joints each. The solution involving the use of a bellows with a rod-cantilever on its flange and with only a ball joint assumes that the relatively short bellows, filled with liquid, works as a ball joint.

The noticeable benefits of this solution, after a comparison with the prior solution, are as follows: translates 100% of the axial component of force to the force sensitive unit; protects delicate force sensitive unit from applied lateral force, torque, mutual angular and lateral movement without creating accuracy lessening friction between the elements that hold the structural parts of the seat together. The present invention also provides stable preliminary compression of the force sensitive element and of eliminates the noise generated by vibration.

BRIEF DESCRIPTION OF THE DRAWINGS

FIGS. 1-24 are scale drawings.

DETAILED DESCRIPTION OF THE INVENTION

Figure 1:
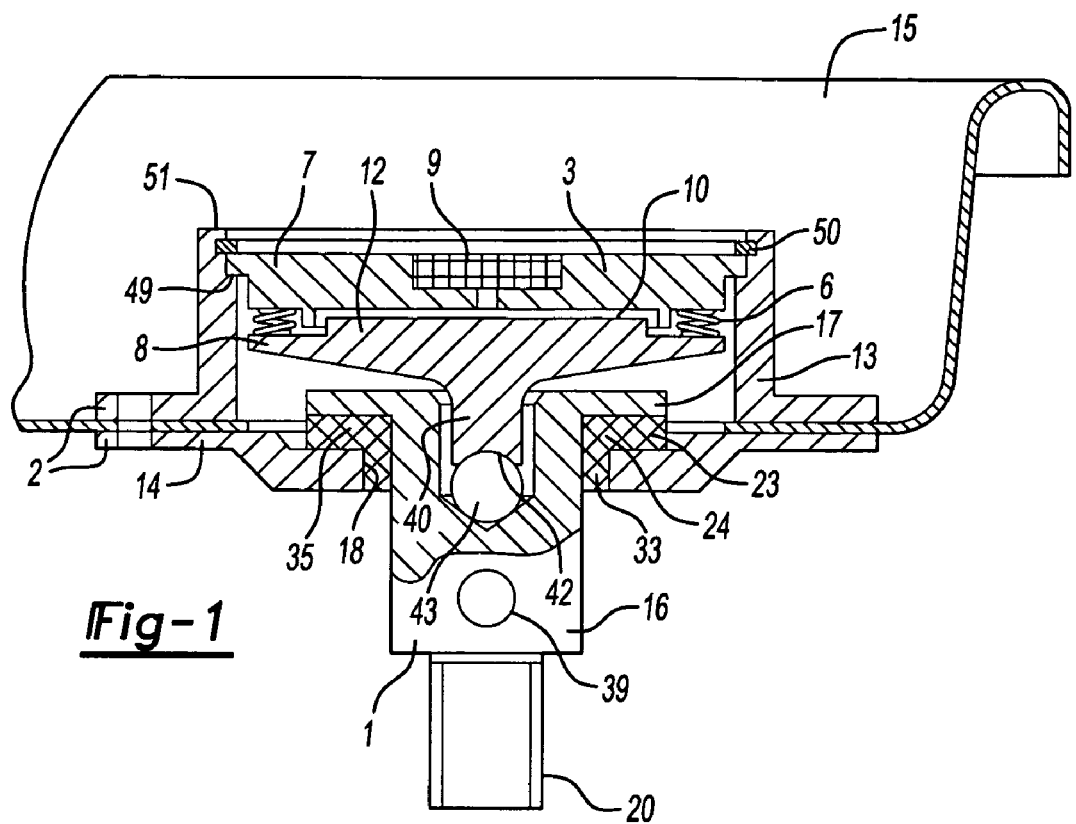
FIGS. 1, 2, 3 show different variants of functional elements and arrangements of them: housing, force transferring mechanism, shock absorbing bushing and the device working for preliminary compression of the force sensitive unit.
Figure 2:
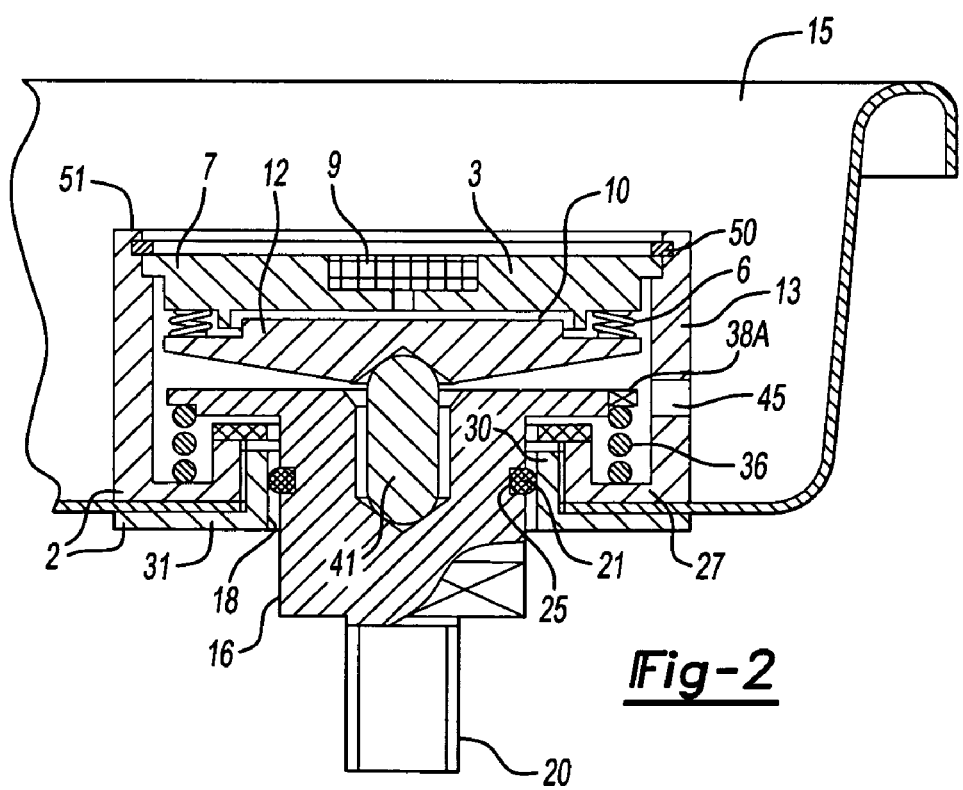
Figure 3:
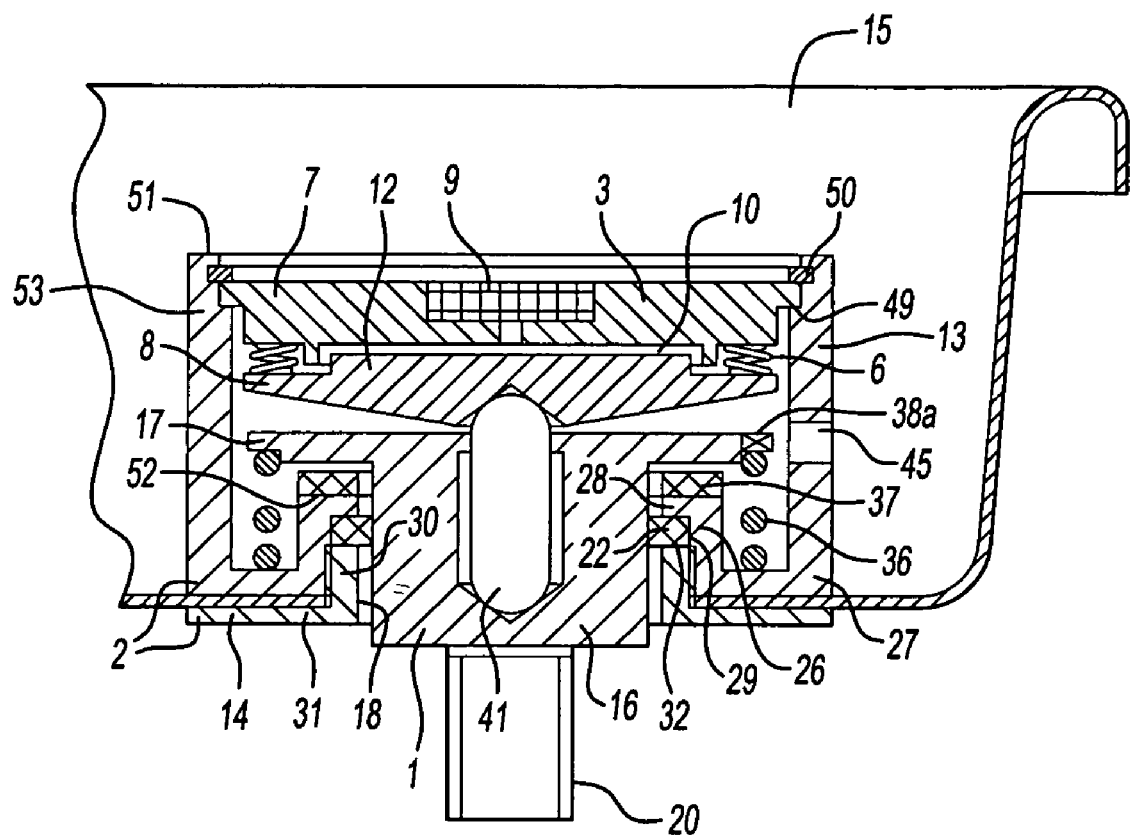

The load cell of the present invention generally includes coaxially oriented lower and upper rigid elements, mount 1 and upper housing 2, that can be attached to the corresponding bottom and upper structural parts of the seat and which construct the contours of the whole load cell (FIG. 1-3). It should be understood that words 'upper' and 'bottom' are used to simplify the description of the invention. The described load cell can be installed in any position.

The force sensitive unit is shown in several variants: in FIG. 1, 2, 3 the hydraulic kind of force sensitive unit 3 is made as a bellows 6 with upper flange 7, bottom flange 8, pressure sensing device 9 on it and filled with a liquid 10. At least one from two flanges 7 and 8 has a boss 12 on its inner surface as high as it is needed for minimizing of the volume of the liquid 10 with saving of warranted gap between flanges.

In FIG. 4-7a, 8, 10-13 this force sensitive unit is shown as a disk spring 4, loaded in its central zone from bottom side. It has at least one tension-measuring device 5 attached to the any flat side 11 of the disk spring 4. Strain gages 5 can be bonded to surface of the disk spring 4 on any side or on both sides of it, to create optimal conditions for receiving of larger output signal.

Figure 7B:
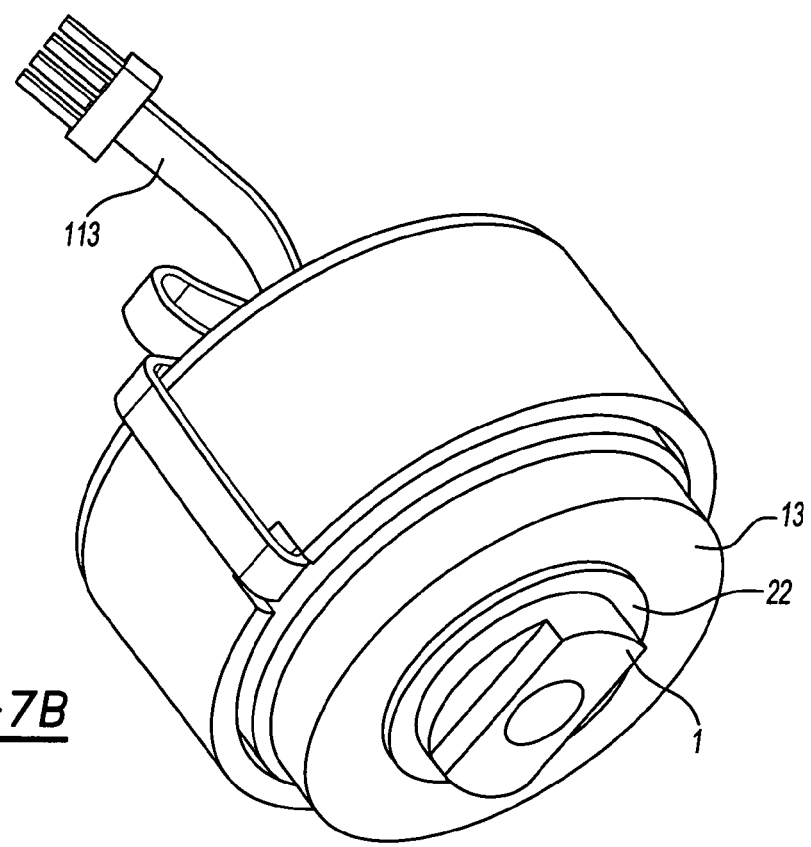
FIGS. 7, 21 show samples of real design, created in accordance to major components of present invention.

Disk spring 4 can be made by stamping technology (FIG. 7, 11) and can have a dome 85 in its center. A steel ball 43 can be placed inside the dome 85 (FIG. 7, 11). Instead of using a ball 43, the outer convex, spherical surface of the dome 85 can be used to mate to a concave, spherical surface of the slider 46 (FIG. 11), in which case a bigger area for installation of a tension-measuring device 5 is available.

Also the disk spring 4 can be made as a flat disk with calibrated thickness (FIG. 4-6, 8, 10, 13, 15, 17, 19-21). A central hole 80 in the flat disk spring 4 can be used to center a ball saddle 81 and the force, applied to the disk 4 (see FIG. 13).

Figure 10:
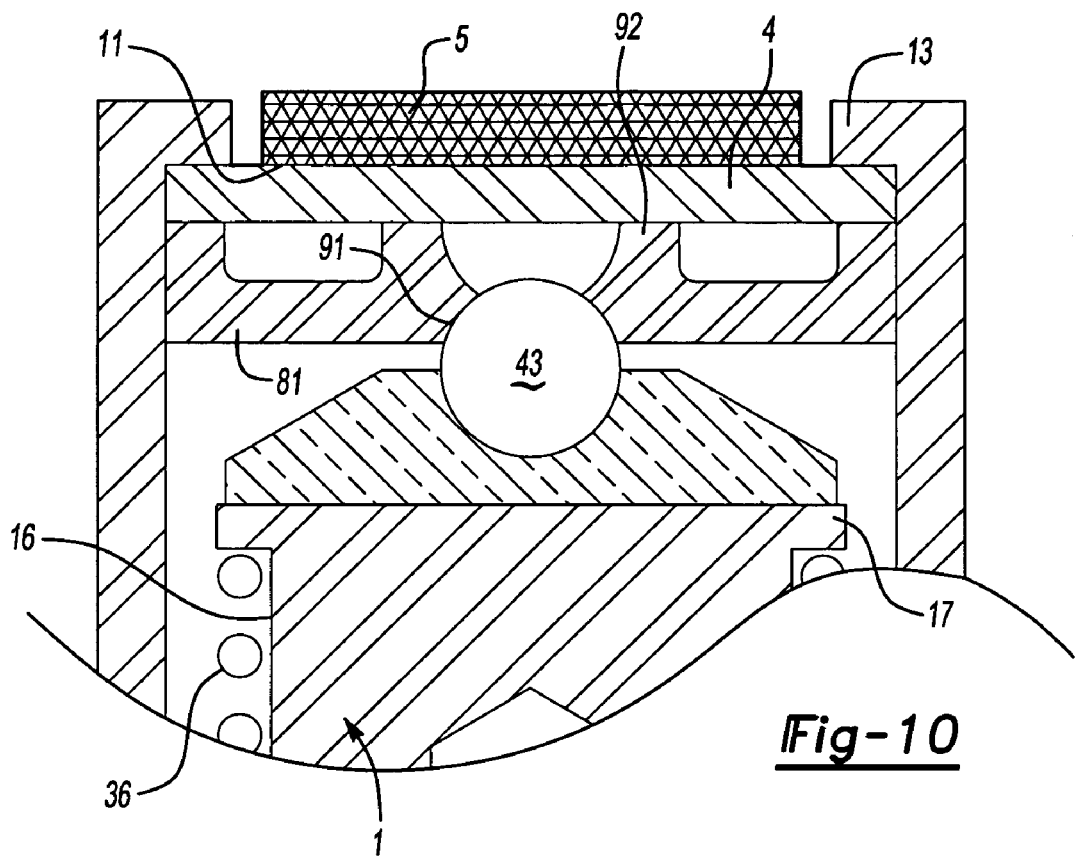
FIGS. 10, 11, 12, 13, 18 represent additional variants of force sensing elements, force transferring mechanism and theirs fragments
Figure 11:
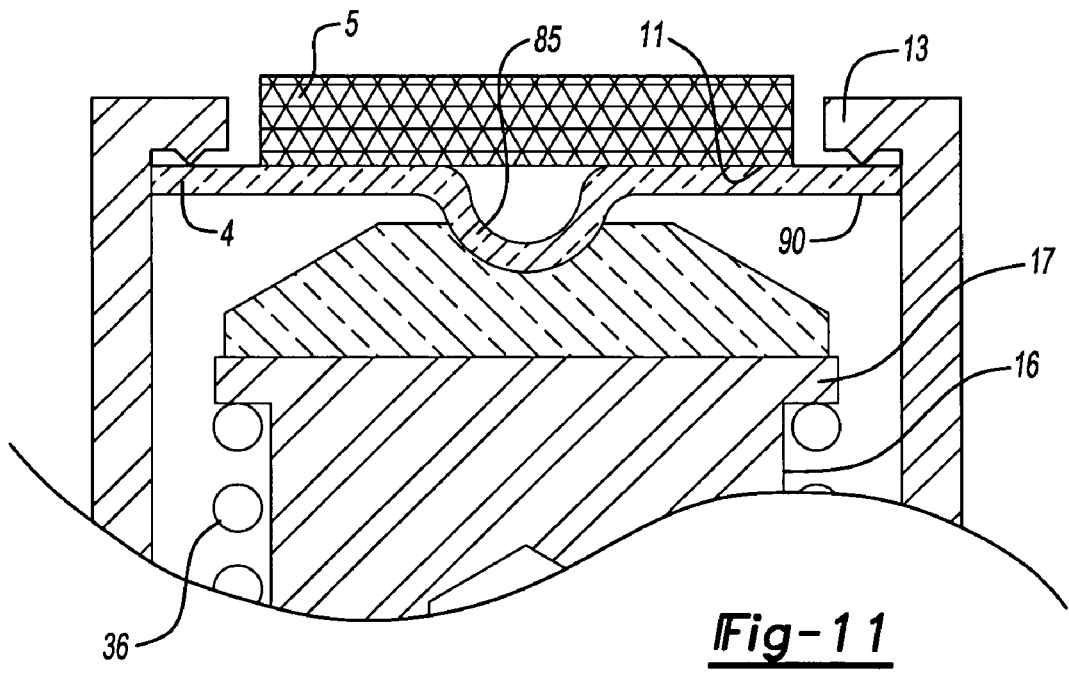

A variant of the disk spring 4, shown in FIG. 10, has the simplest shape of the flat disk 4. In this arrangement the centering of applied force is provided by the special sort of a ball saddle 81, having also disk shape, centered by its outer diameter 82 in the body of a load cell. The ball saddle determines proper location of a ball 43 in recessed portion 91 of the saddle 81. Saddle 81 has a circular boss 92 for predictable and repeatable location of area of a force, applied to the spring 4.

The upper housing 2 can include mutually detachable housing 13 and mounting flange 14, which is able to be mechanically attached to the upper structural part 15 of the seat or be integrated in the structural part. In FIG. 1, 2, 3 such structural part of the seat appears as the peripheral zone on the bottom of the seat pan 15. The mounting flange can have a shape of a plate (FIG. 1). In FIG. 2, 3, 7a, 14 some special kind of the detachable mounting flange 14 is shown, it has cylindrical 30 and flat portions 31, this flange can be mechanically attached to the upper structural part 15 of the seat or integrated in the structural part, for example in the seat pan of the bucket seat.

The housing 13 in variants, shown in FIG. 2-3, includes outer 53 and inner 26 coaxial cylindrical walls that are connected to the each other through a disk shaped bottom wall 27 and oriented up; the inner cylindrical wall 26 has lesser height than the outer cylindrical wall 53.

The bottom mount 1 appears as a stud that includes a stem 16 and a head 17 located on the top of the stem 16.

The head 17 of the stud is placed inside of the upper rigid element 2 and the stem 16 is oriented coaxially in the hole 18 of the upper rigid element.

Figure 6:
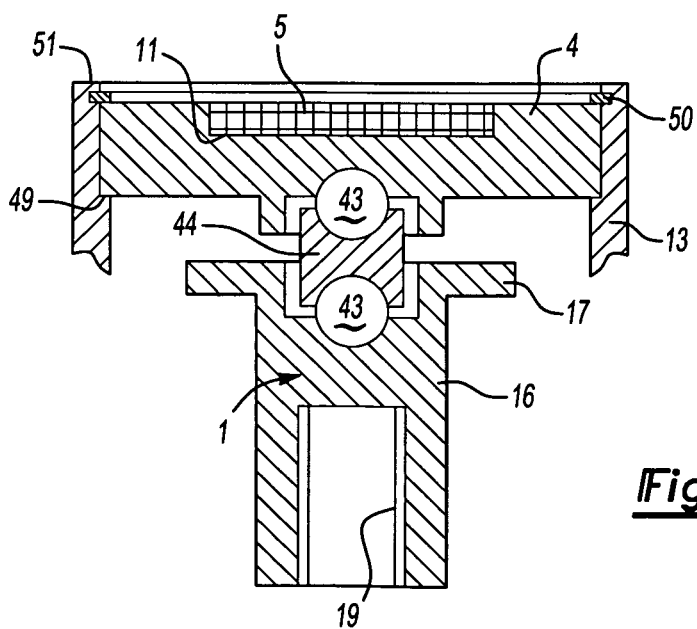

The bottom end of the mount 1 is made attachable to the bottom structural part of the seat with use of at least one axial blind threaded hole 19, drilled from the bottom end (FIG. 6, 15). Also the mount 1 can have an outer threaded partition 20 on its bottom end with the diameter less than the cross dimension of the stem 16 and it can be fastened on the bottom structural part of the seat.

The mount 1 can be connected for example to the upper slider 88 of the seat track mechanism (FIG. 9a, 15, 17, 19-21).

In any of the shown variants there is a gap between the surface of the stem 16 and the inner surface of an axial hole 18 in the upper rigid element 2. This gap must be partly or completely filled by installed there shock absorbing bushing that appears as the O-ring 21 (the FIG. 2), having standard proportions and installed in the circular grove 25 on the body of the stem 16 (FIG. 2).

For the second variant of the placement of the shock absorbing bushing 22 (FIG. 3), inner cylindrical wall 26 of the housing on its upper edge has directed inside circular shoulder 28 and the shock absorbing bushing 22 is placed between bottom surface 29 of this shoulder and trust surface 32 of the cylindrical portion 30 of the detachable mounting flange 14.

The third variant of the shock absorbing bushing 24 (FIG. 1) appears as a body of a rotation: cylinder 33 with a radial shoulder 23 on it, the bushing is installed on the stem 16 of the mount 1 and the radial shoulder 23 mates the bottom surface 35 of the stud head 17.

Figure 15:
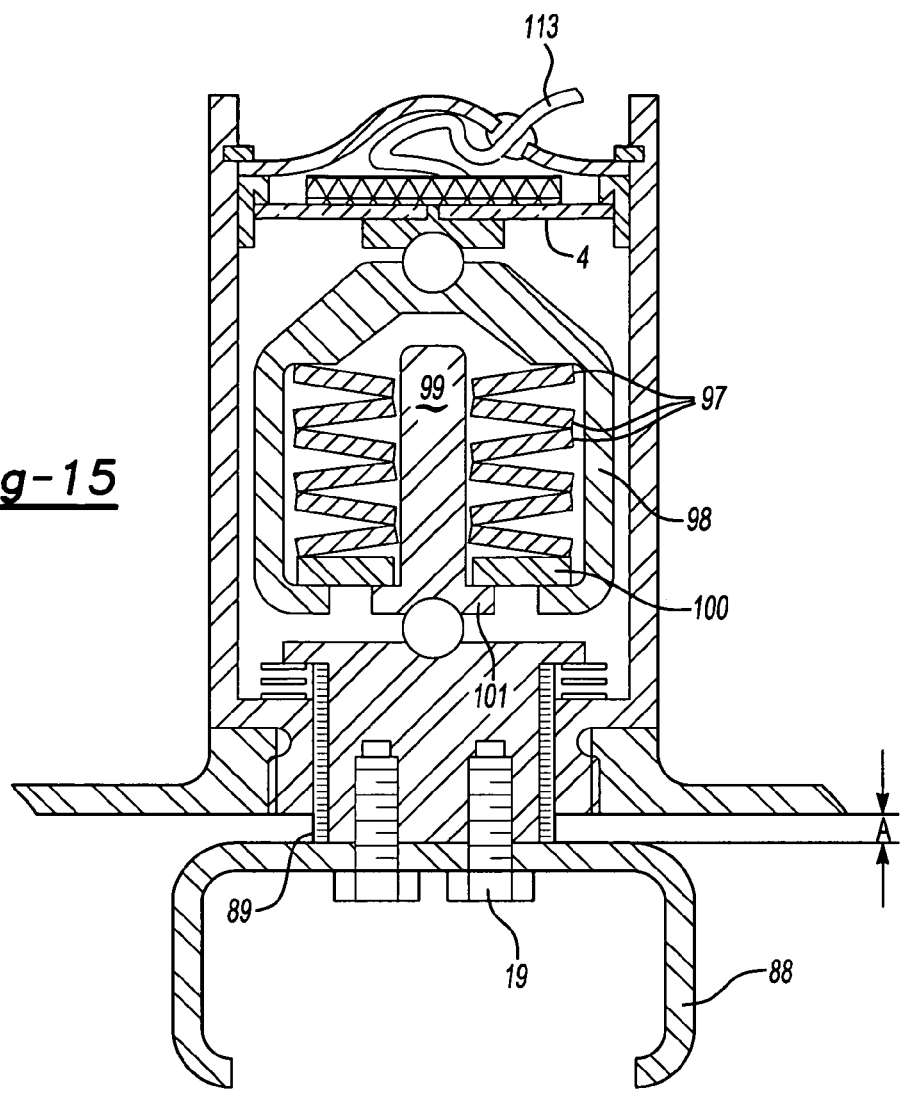
FIGS. 15, 16, 17, 19, 20, 22 show illustrations of how overload protectors can be integrated in the load cell.

The fourth variant, shown in FIG. 15, is just a cylinder, installed on the stem 16 of the stud.

The fifth variant is cylindrical in general bushing (FIG. 17, 19), filling the groove 90 on the stem 1; the bushing 89 overlaps mated to it inner surface of the hole 18 in the upper housing 2 or its detachable component.

Figure 21:
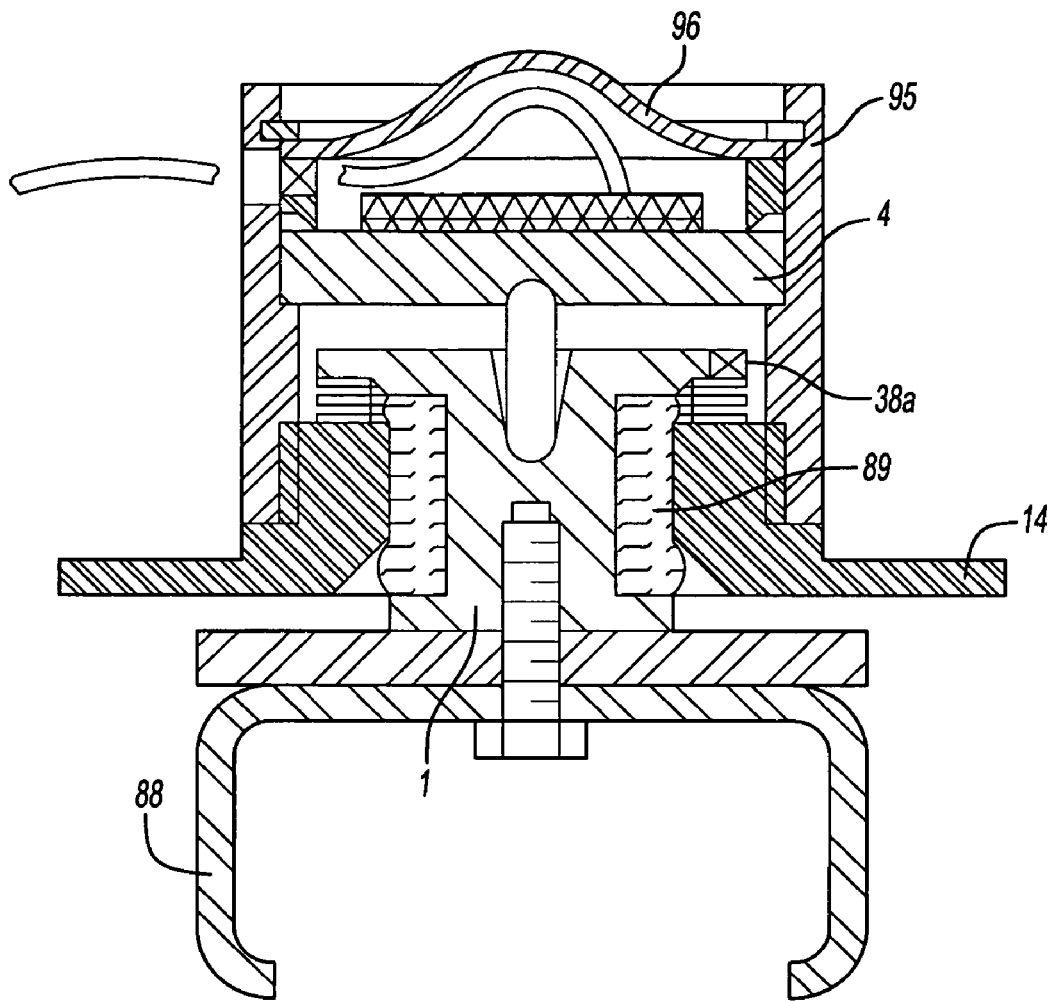

The sixth variant is also cylindrical one but covers a side surface of the stem 16 of the stud, the bushing is located between bottom surface of the head 17 and upper surface 102 of flat portion 103 of overload stopper 104 (FIG. 21).

The device creating preliminary force on any available kind of the force sensitive unit can differ. In the simplest case it can be the third variant of the shock absorbing bushing 24, shown in FIG. 1; but the difference is that radial shoulder 23 of this bushing 24 must be compressed by mated with it surfaces in the axial direction.

For better accuracy the spring 36 can be used (FIG. 2, 3, 7a, 8-14) especially if it appears as the wave one (FIG. 7a, 14, 15, 17, 19-21).

Figure 14:
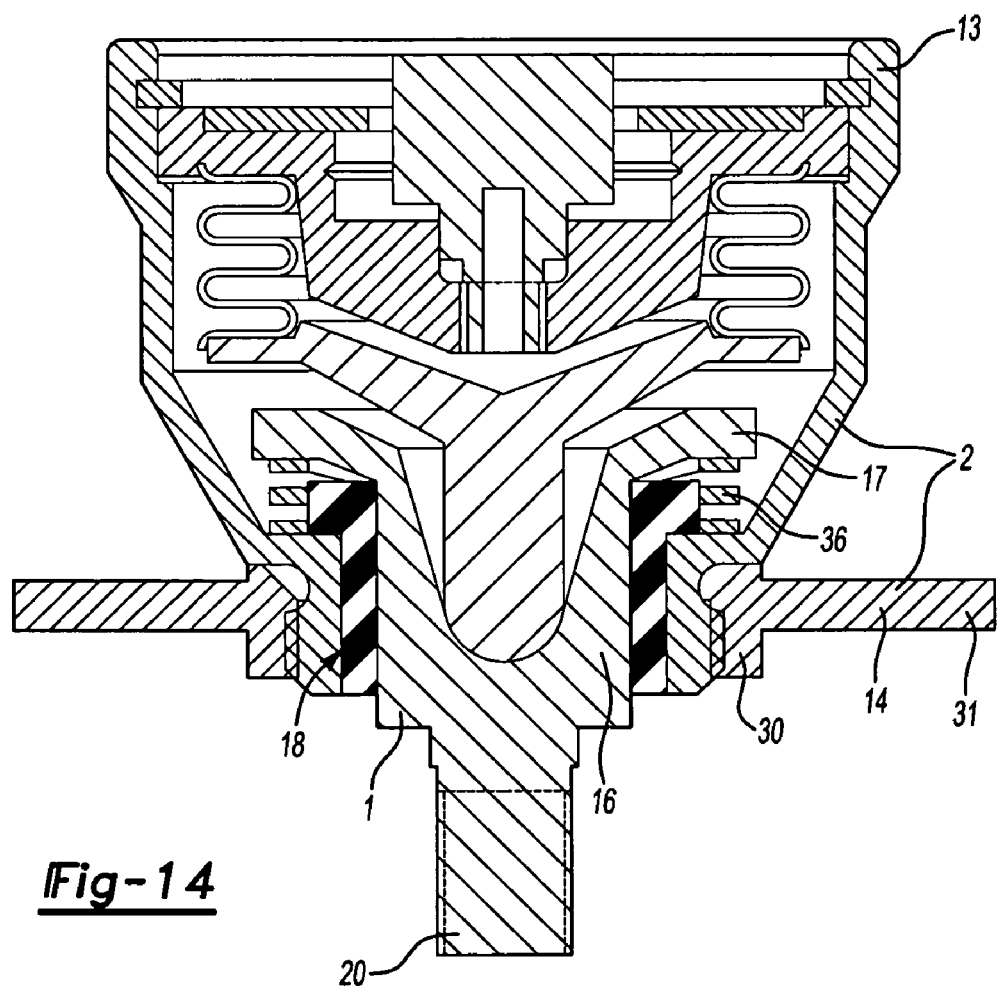
FIG. 14 shows variant of load cell, arranged for relatively quick installation of load cells in broad range of standard seats without serious redesign of them.

A separate shock absorbing disk washer 37 (FIG. 3) can be installed for extra noise reduction and for a creation of the primary load instead of the spring 36. To perform this function, it can be compressed during assembly of the load cell between bottom corresponding surface of the head 17 of the mount 1 and surface 52 in the upper housing 2. It does not matter for the functionality, if the last pointed surface 52 belongs to the detachable component 14 of the upper housing 2, or as shown In FIG. 14, 15.

Additional embodiments are described below.

In FIG. 7a the radial shoulder 23 of shock absorbing bushing 24 is locked in an annular space between flat shoulder 87 of the upper rigid element 2 and a ring—bushing holder 83. Rubber bushing here is not pre-compressed, because the ring—bushing holder 83 is supported from bottom side by a circular shoulder 94, located inside of the upper rigid element.

Figure 8:
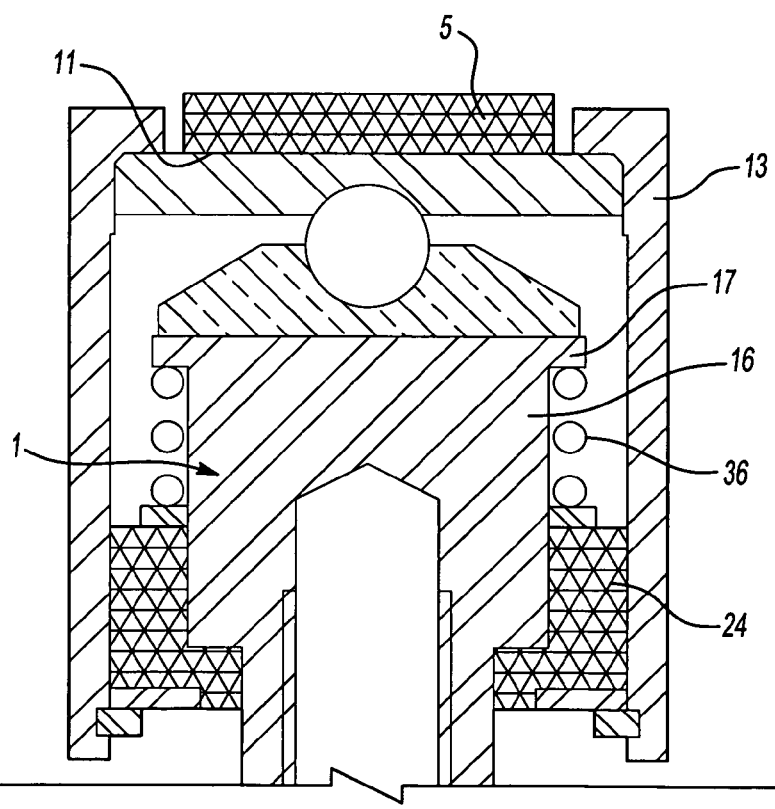
FIG. 8 shows a sample of a shock absorbing bushing that is pre-compressed by the same spring that creates pre-load of the force sensitive unit.
Figure 9A:
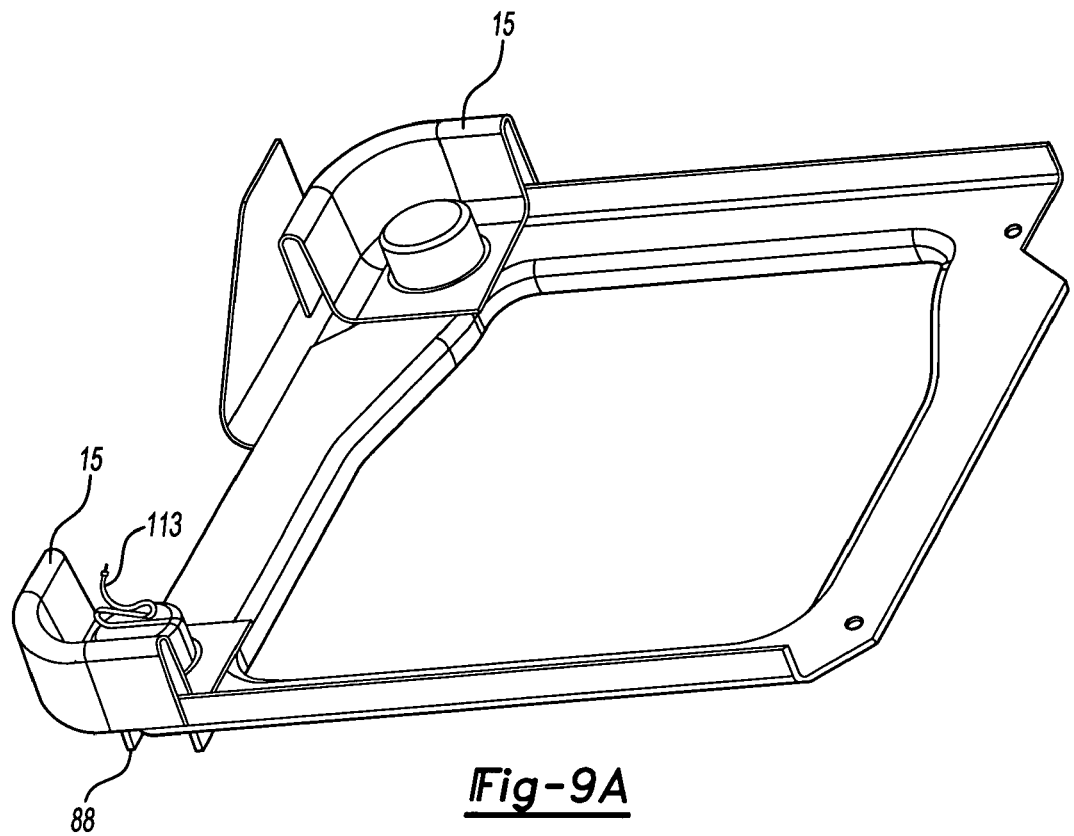
FIGS. 9a, b shows recommended approach for seat frame and seat pan modifications that returns traditional stiffness to the standard seat after seat pan is installed on proposed here load cells.
Figure 9B:
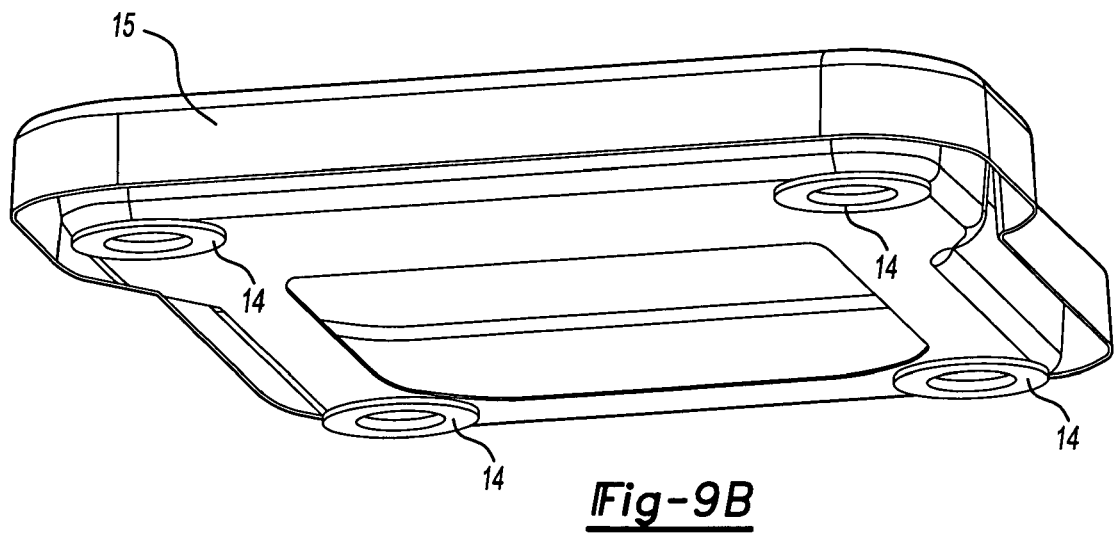

In FIG. 8 one more variant of pre-compressed shock absorbing bushing 24 is shown: axial force, created by the spring 36, is transmitted though the bushing 24. Such arrangement causes expansion of the bushing in horizontal direction and stops rubbing of cylindrical surfaces of a bushing on mated metallic surfaces and eliminates wear.

The mount 1 can have at least one flat 38 (FIG. 2) on the bottom end of the stem 16 or at least one radial hole 39 (FIG. 1) to allow for the use of torque tools during an assembly. The flats can work also as a retaining means during assembly, in the case if the mated part of a seat has oval shape mounting hole.

For the purpose of minimizing the axial dimension of the load cell, if there is not enough space for the flat 38, the head 17 of the mount 1 can have at least one axial notch 38A on the periphery of the head 17 and aligned to at least one opening 45 in the body of the upper rigid element (FIGS. 2, 3.). It can be helpful during assembly if minor defects on the inner or outer thread on the mount 1 exist and the friction created by chosen compressing element is not enough to secure the mount 1 from a twist during assembly.

Several variants of a force-transferring scheme are offered to choose from:

In FIGS. 1, 14: a rigid rod cantilever 40 is made on the bottom flange of the hydraulic kind of the force sensitive unit 3, the rod cantilever 40 is pointed in the direction of the mount 1; the bottom end 42 of the rod-cantilever is prepared to work as a component of a ball joint located in the recessed portion of the mount 1: the end 42 has either spherical trust surface (not shown) or recessed portion for mating with a ball 43. In FIGS. 2, 3 the joints are done as a rod 41 with spherical ends, the rod is installed by its ends in the recessed portions on opposing surfaces of the mount 1 and the force sensitive unit, for example, the disk spring 4. The rod 41 similarly to just describe the rod-cantilever 40 can be done as the complex one, with a core 44 and two balls 43 on both ends of it (FIG. 6).

Figure 4:
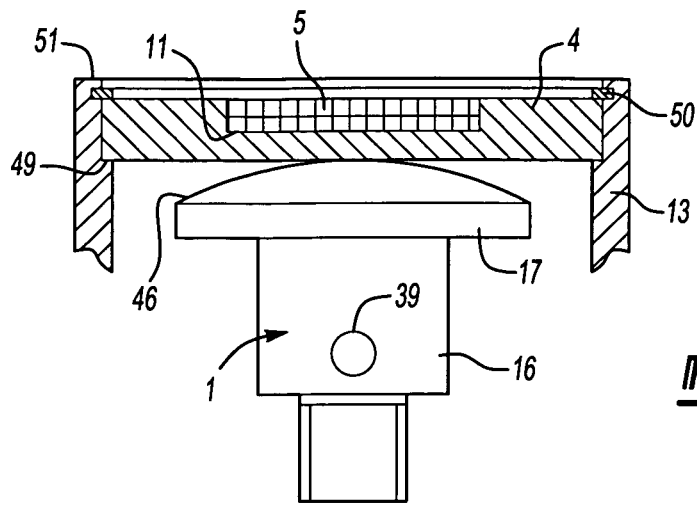
FIGS. 4-6 show other variants of the elements transferring force to the force sensitive unit and theirs components.

In FIG. 4 the mount 1 mates with the force-sensing unit, for example with the disk spring 4 by its rounded upper surface 48. The housing 13 has a circular inner shoulder 49 on the inner surface of the outer cylindrical wall 53, any kind of force sensitive unit is installed coaxially inside of the housing and locked between the circular shoulder 49 and retaining ring, installed near free edge 51 of this outer cylindrical wall.

Figure 5:
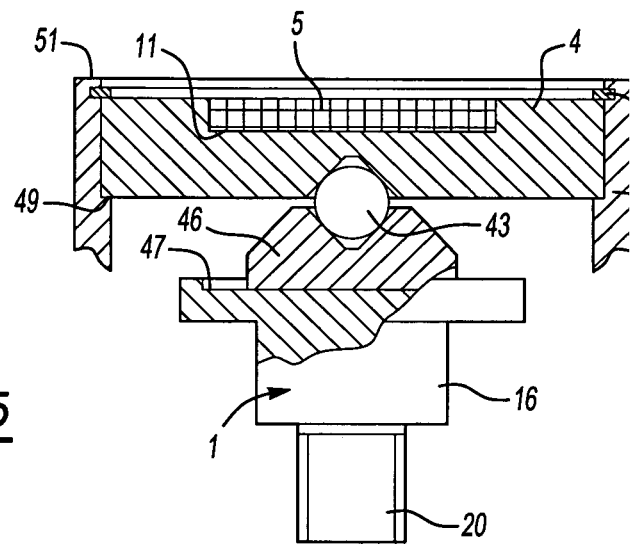

The floating tablet 46 with installed ball 43 on it can be used too (FIG. 5, 8, 10, 12, 13, 17, 18). It is able to slide on the flat surface 47 of the mount 1.

A layer of material with a low friction coefficient 114 can be placed in sliding pair. Either of mated surfaces can have a labyrinth seal 115 on the periphery of it to stop losses of a low-friction material when it is partly deteriorated. It can lengthen a life of the device.

Figure 12:
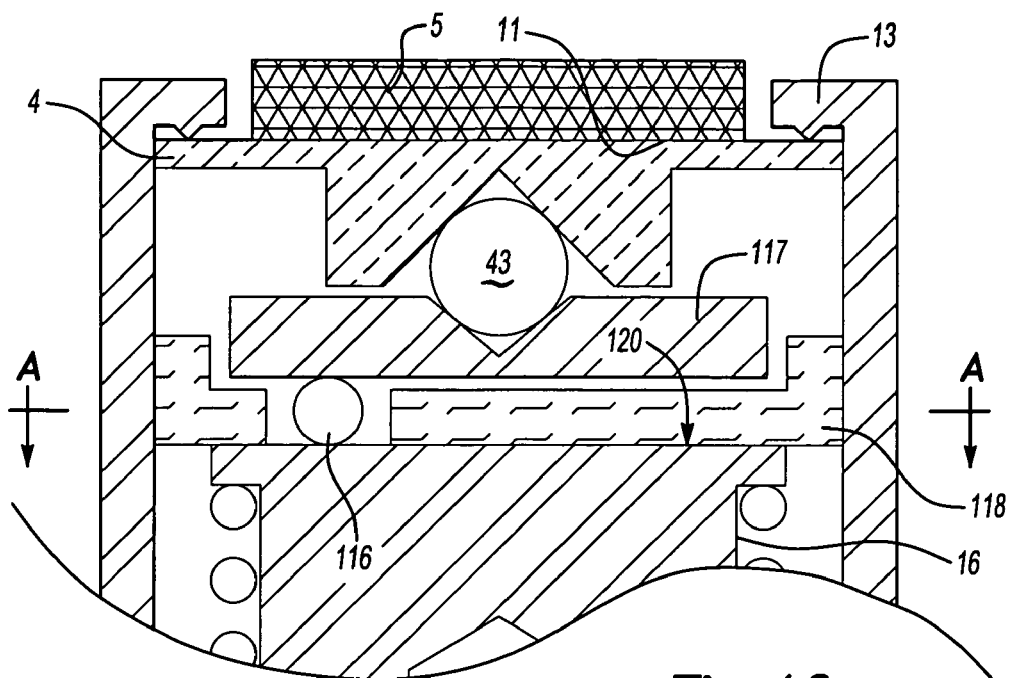
Figure 12A:
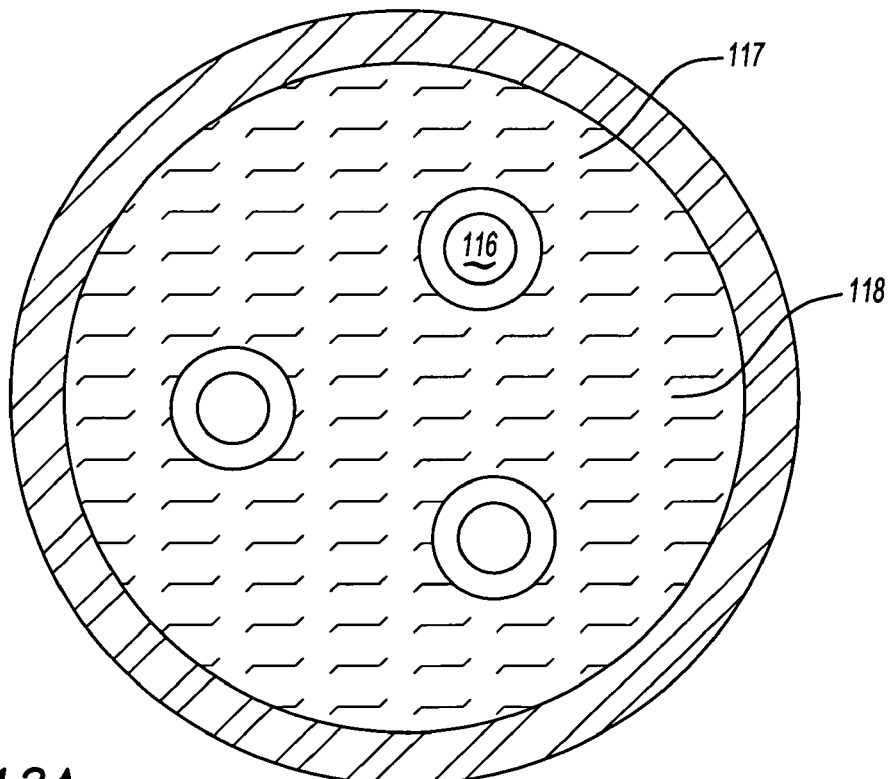

Another force transferring mechanism is shown in FIG. 12.

Instead of a sliding pair, as described above, here the rolling ball floating thrust support is made. At least three steel balls 116 are placed between hardened flat surfaces of the stud and the floating element 117. A separator 118, made of elastomeric material, corrects a primary position of balls 116 in moments when the load cell is unloaded. Lateral minor movements of loaded seat causes safe oscillation of the balls, without creation of noticeable friction. Axial component of the force is applied to the force sensitive unit and is adequate one to its real physical value.

Figure 13:
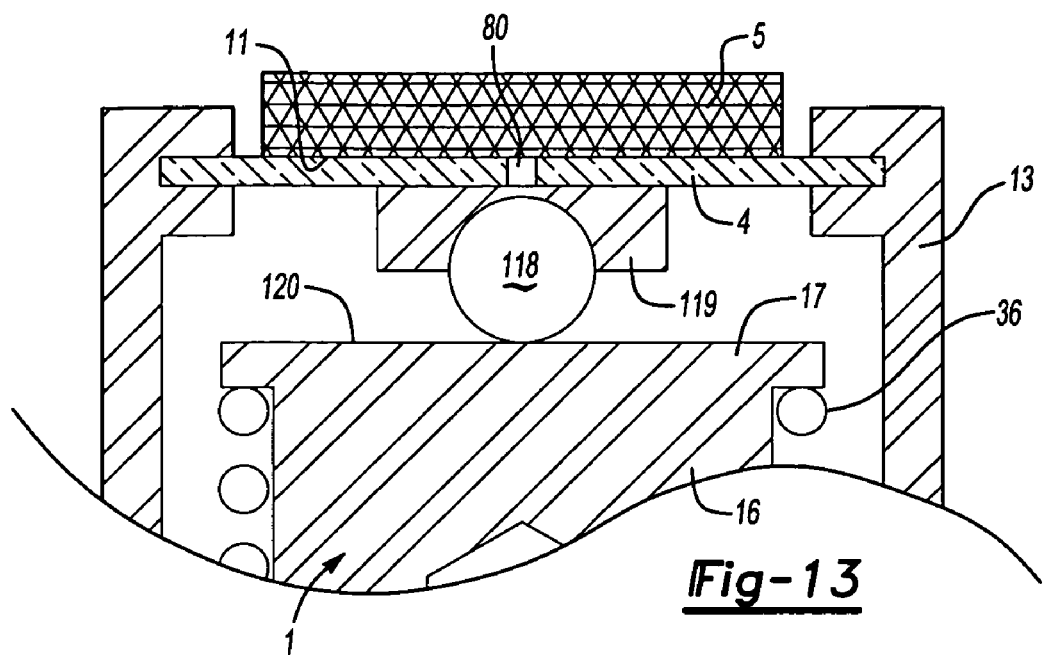

Very close to previous is another variant, shown in FIG. 13. Here just one steel ball 118 is used, it rotates in the saddle 119, made from anti-friction material, for example, brass. By its bottom point the ball rolls on flat surface 120 on the top of the mount 1. Obviously the surface 120 must be hardened as one in ball bearings.

The bottom surface 35 of the stud head can have the circular shoulder that helps centering of the spring 36.

Means of overload protection are shown in FIG. 15-17, 19, 20.

The idea is having of compressible member, filled with of spring washers (Bellevibic, Belleville washers). Being collected in a battery and pre-compressed on the stage of a subassembly, they work as a solid body until axial compressing force grows beyond upper limit of a measuring range for a chosen force sensitive unit. With further increase of applied axial force, spring subassembly shrinks in the axial direction. The distance between structural parts of the seat decreases until the gap between them turns zero. It is a good idea to have a special part or a fragment of any part, having mechanical connection with any structural part, which is distanced from another (incoming) structural part on the distance of 75% of the possible shrinkability of the compressible member. This distance 'A' is shown in FIG. 15-17, 19, 20.

In FIG. 15 a sample of possible design of similar overload-protected concept is shown. Spring washers 97 are collected in a battery inside of the cup-shaped body 98. Pusher 99 is centered by inner diameter of washers. Free edge of the cup-shaped body 98 is bent inside of a body and holds spring washers 97 in compressed condition. It is recommended that last washer 100, inserted in the body 98, was quite rigid. Pusher 99 has a circular shoulder 101 on its bottom (on the picture) end. The shoulder 101 transmits applied axial force to spring washers. As soon the value of the force is getting more than a force, "storing" inside of the compressible member, the pusher 99 starts submerging inside of the cup-shaped body 98. Such movement shrinks the gap 'A' until it closes. Further increase of applied compressing force does not increase load on the force sensitive element (in present case it is the disk spring 4) because the force is transmitted from one structural part of the seat to another directly.

Figure 16:
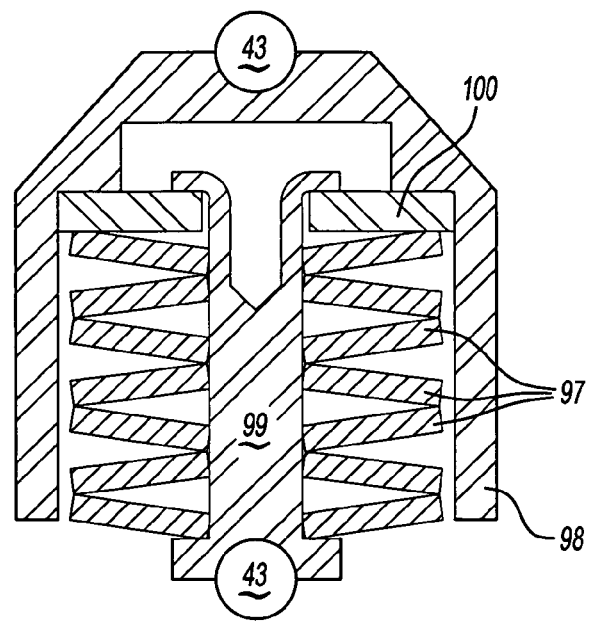
Figure 17:
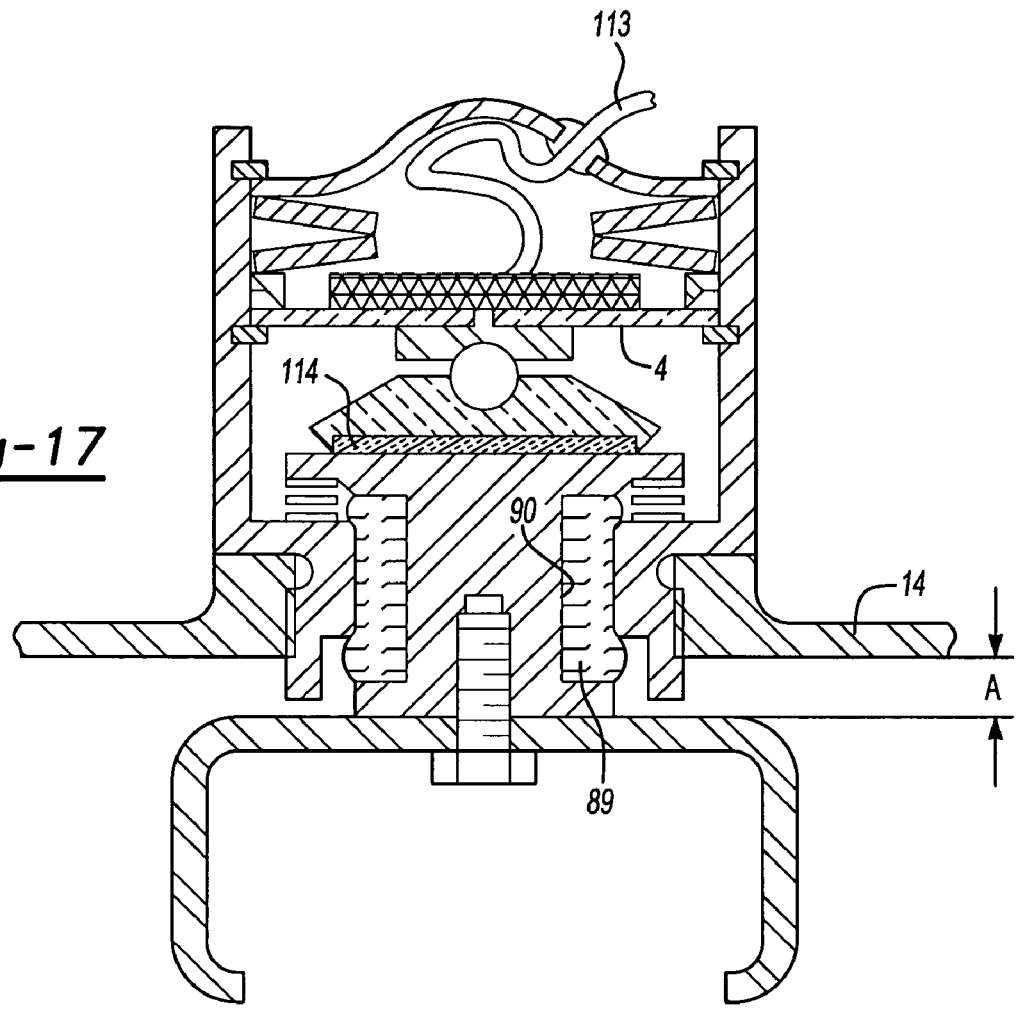
Figure 18:
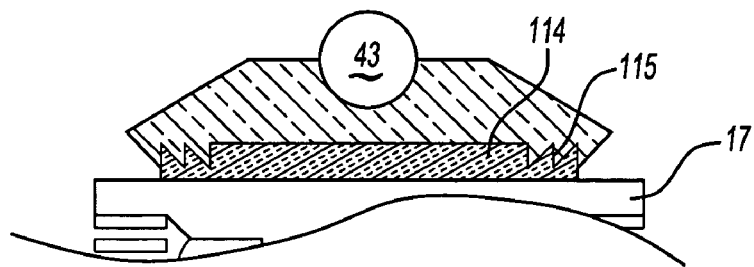

Close variant of the compressible member is shown in FIG. 16. The difference from shown previous variant is that set of the spring washers 97 is compressed on the pusher 99 between shoulders on both ends of it. In this case the body 98 of the compressible member pushes on the last washer 100 and can compress spring washers.

Figure 22:
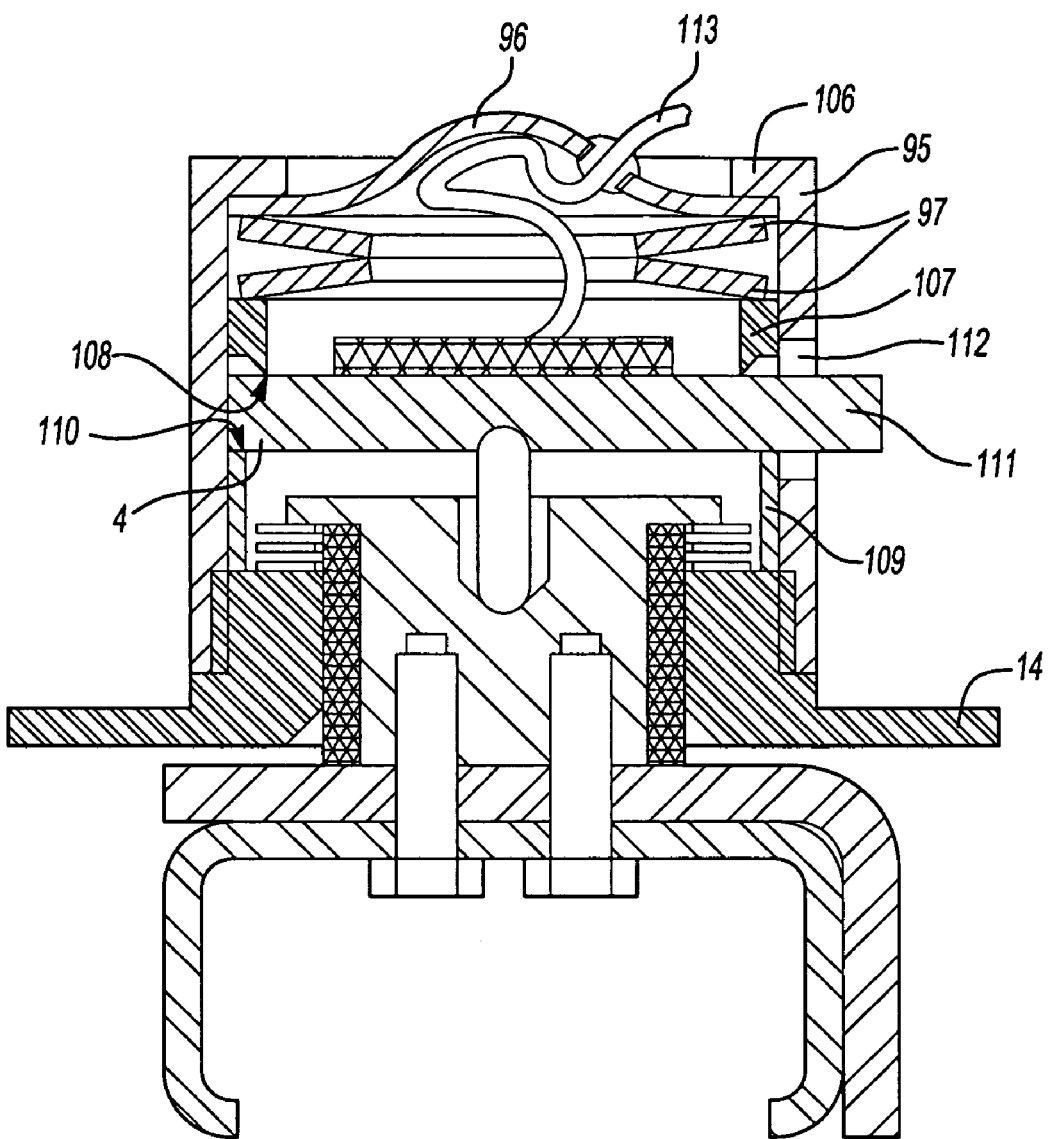

Compressible elements can be placed also over the force sensitive unit. In FIG. 22 such arrangement is shown on the sample of the load cell, having disk spring 4 as a force sensitive unit. A set of spring washers is compressed between inner circular shoulder 106 on the top end of the cylindrical detachable housing 95 and the disk spring 4. Protective cover 96 can be placed between the shoulder 96 and the upper spring washer 97. On the opposite side of a set of spring washers 97, the ring 107 with relatively sharp edge 108 creates stable support zone for the disk spring 4. This is done for better accuracy of the device.

The set of washer springs 97 from previous example (FIG. 22) can be pre-compressed during installation of the detachable housing 95 on mounting flange 14. For this purpose a distancing cylinder 109, mated to inner surface if the detachable housing 95, supports the disk spring from the bottom. During installation of the detachable housing 95, spring washers 97 are compressed by a force, transmitted through the cylinder 109 and the ring 107. It is recommended that the ring 107 had also relatively sharp edge 110, mated to the body of the spring 4 and diameters of the two edges, squeezing the outer edge of the spring 4, were equal. If a threaded connection is used for connecting of the detachable housing 95, it is good idea to fix the disk spring 4 against turning of it in the detachable housing 95. For this purpose a bunch of means can be used, for example, the spring disk 4 can have a radial tooth 111 on its outer edge. The tooth can be placed in the axial groove, or hole 112, or notch on the body of the detachable housing 95. The same tooth 111 can be used for a placement of the communication cable 113 for safe crossing of the body of the load cell.

The just-described variant does not require the use of a retaining ring and simplifies a shape of three parts to the simplest tubular shape and some technological operation with their edges.

Excepting axial force, lateral force can be applied to the load cell. It loads the shock absorbing bushing by compressing of one side of it in the radial direction. Loadability of the bushing in the lateral direction depends on properties of the elastomeric material of the bushing and the geometrical shape of the bushing. If the applied lateral force is sufficient to puncture or wear out the bushing, the load cell continues working but the measurement error can be as high as the amount of the lateral force, multiplied on the friction coefficient between touching pair of materials of the stud and mated portion of the upper rigid element (housing). This situation is preferably diagnosed by the software because the output signal will have a tendency to "freeze" and change its value by sudden steps.

Figure 19:
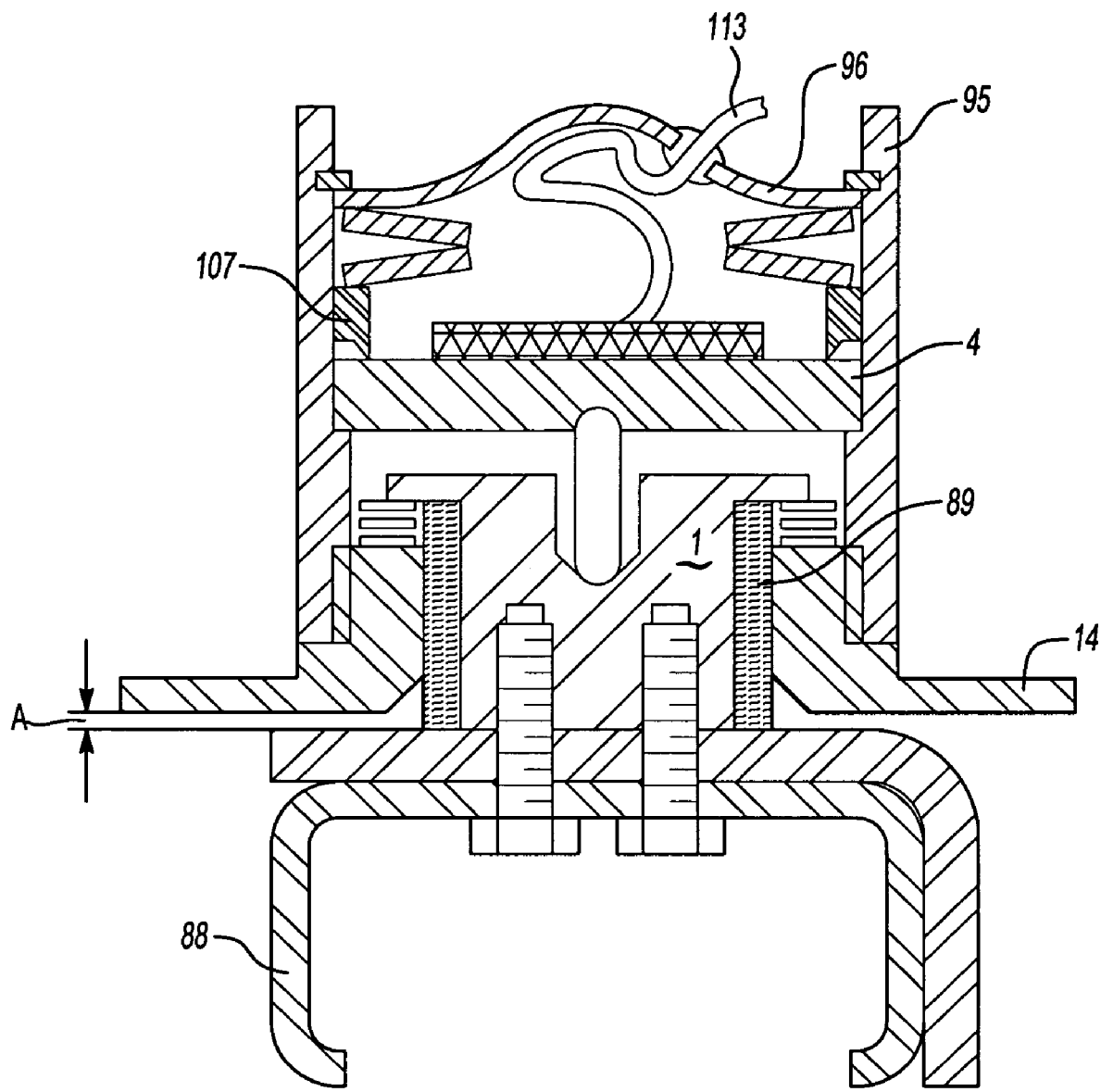
Figure 20:
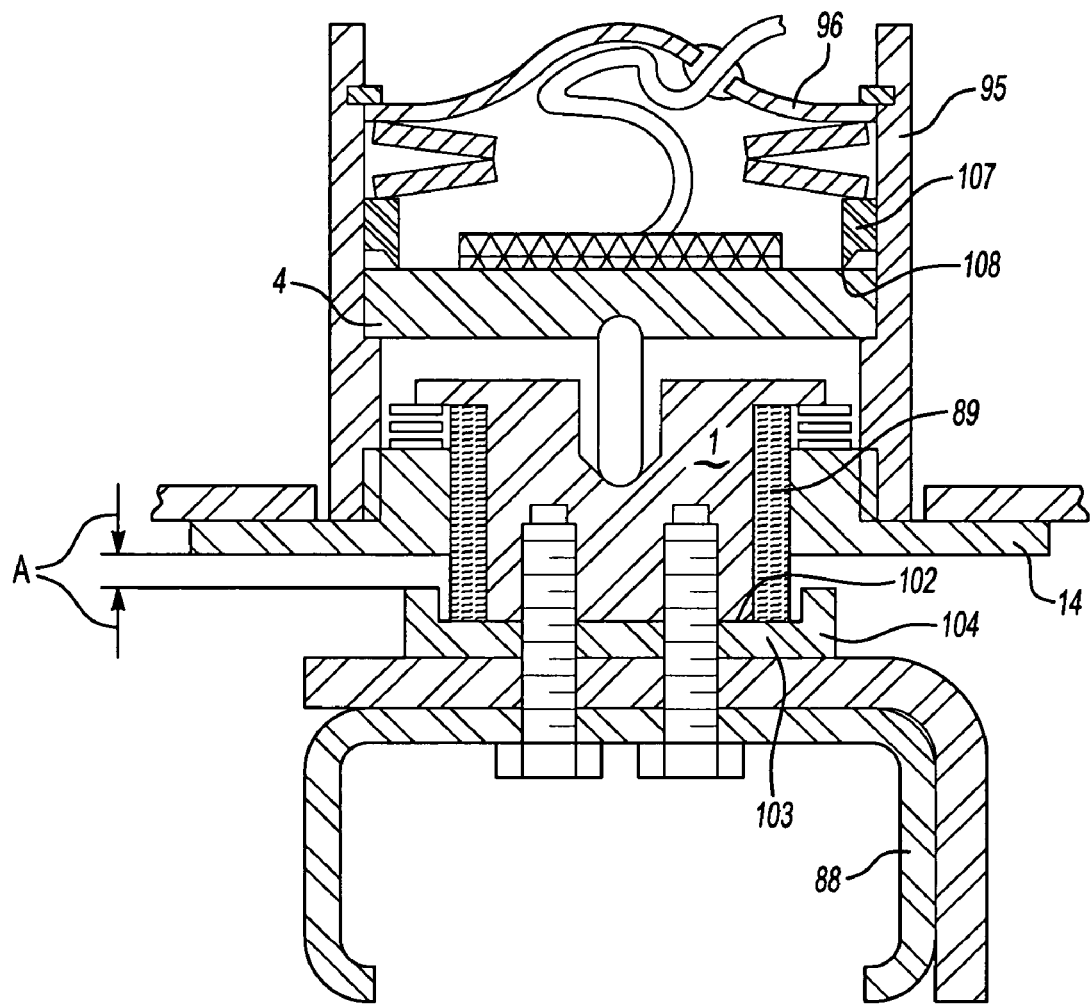

Variants of an arrangement, shown In FIGS. 19-21, can give definite benefits for assembly procedure. The benefits are caused by the detachability of the precision portion: force sensitive element and its surrounding parts can be installed on the last stage of assembly, just before installation of a set cover. The common feature of these arrangements is a detachable variant of the housing 95 that holds inside of it the force sensitive unit—spring disk 4, optional electronic devices and protective cover 96 over the delicate parts. The housing 95 has a generally cylindrical shape, and the bottom end of it has an inner thread for connection with the mounting flange 14. The mount 1 on its head has means for holding it during fastening, for example, notches 38A.

Within this variant of an arrangement, described below sequence of an assembly is recommended:

First step: the mounts 1, having force absorbing bushings on them, are installed by theirs heads in the assembly jig accordingly to their future mutual disposition in the seat pan and fixed there.

Second step: seat pan 15, having mounting flange on it, is worn on all studs.

Third step: upper slider 88 of the seat track mechanism is fastened to the bottom end of the stem 16 of the mount 1, and all accompanying parts, that are usually squeezed between seat pan and the upper slider, are squeezed now between the upper slider 88 and the stem 16. These parts can be a mount—seat back ratchet mechanism holder, various reinforcing plates and bars.

Fourth step: the seat pan 15 with fastened to it portion of seat frame is ready for removing from the assembly jig and for further assembly.

Invented load cell for multiple placements between mating couples of structural parts of a seat for determination of the seat occupant's weight and position works by the way described below.

For easy explanations let us assume that the upper structural part of the seat is not deflectable.

The bottom structural part can make some minor movements and slight changes in its angular orientation in all coordinate planes when variable load is applied.

The shock absorbing bushing handles lateral forces and deflects but leaves freedom for minor vertical movements within the elasticity of the bushing.

The force transferring system that consists of the joints transmits the axial component of the applied force to the chosen point or predictable area of the force sensitive unit. The relatively wide head of the stud is locked inside of the upper rigid element and keeps the structural parts of the seat together. Preloaded spring or primarily compressed shock-absorbing material helps to have relatively stable reference point for calibrating the measuring system and for the elimination of noise caused by vibration. The force sensitive unit sends an output signal to the software, which analyses the information from the variety of sensors for adequate decision making.

In the case if the force sensitive unit is done as a hydraulic chamber equipped with a pressure sensor.

Figure 23:
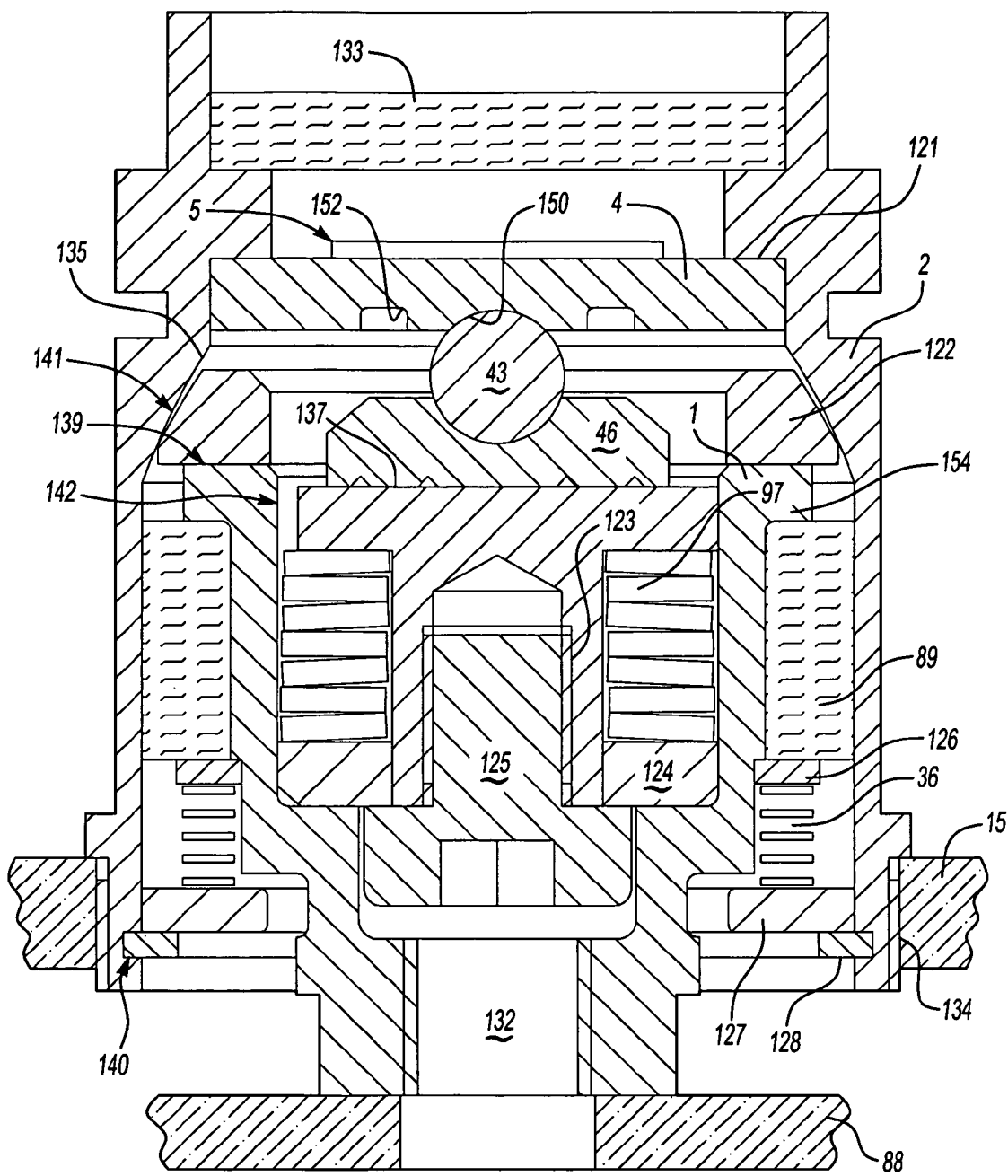
FIG. 23 shows another embodiment of the load cell of the present invention.

Another embodiment of the load cell of the present invention is shown in FIG. 23. The load cell includes a mount 1 for attachment to the lower structural seat part 88 via a threaded hole 132 and a housing 2 for attachment to the upper structural seat part 15 via a threaded connection 134. An electronic circuit 133 for processing signals from the strain gage 5 is mounted above a flange 121 in the housing 2. The strain gage 5 is secured to the upper surface of the disk spring 4. The outer periphery of the upper surface of the disk spring 4 contacts the flange 121 of the housing 2. The lower surface of the disk spring 4 includes a spherical recess 150. The recess 150 is encircled by an annular recess 152. The recess 150 receives a ball bearing 43, which also engages a recess on slider 46. The slider 46 is slidably supported on a thrust surface 137 of piston 123. The sliding surface of slider 46 includes grooves filled with a lifetime lubricant. The piston 123 is slidably mounted within mount 1.

Wave or Belleveille springs 97 are precompressed and urge the piston 123 upwardly relative to support ring 124 and mount 1. The Belleville springs 97 preload the sensor by exerting a force on slider 46, ball bearing 43 and disk spring 4. Preload bolt 125 is received within piston 123 and within a recess in mount 1. Preload bolt 125 limits the travel of piston 123 from the Belleville springs 97 when it engages the support ring 124.

Spaced below the flange 121 of the housing 2, the housing includes an inner, annular, conical, concave surface 135 engaging a complementary surface on trap ring 122. The trap ring 122 is slidably supported on an upper surface 139 of the mount 1. The trap ring 122 provides overload protection to the sensor while still permitting relative lateral movement between the lower 1 and upper 2 elements. The trap ring 122 is a floating member coming into contact with the housing 2 equally well at both angular and linear misalignments when overload protection actuates. The trap ring 122 slides on the top surface 139 of the mount to provide a lateral compliance to linear misalignments. Spherical surface of the trap ring 122 provides a sphere-to-sphere contact with the housing 2 for angular misalignment.

Bushing 89 is mounted between mount 1 and housing 2 below an outer flange 154 of mount 1. The bushing 89 is supported by top washer 126 biased by spring 36 which is supported by support washer 127. A snap ring 228 secured within an annular groove 140 on housing 2 retains the support washer 127. The bushing 87 may be designed as a rubber sleeve 89 with the outside surface 138 coated with Teflon. Teflon coating ensures low-friction axial sliding ability of the housing 2 in both positive and negative overload mode. This is important in order to remove a residual frictional hysteresis, which may negatively affect the performance of the sensor after overload protection actuation. In the operating range, the movement of the housing 2 corresponds to the deflection of the sensing disk 4, which is very minor and can be compensated by elasticity of the rubber. No physical sliding between the bushing 89 and its neighboring parts occurs in operating range.

In operation, when zero load is applied, the sensing disk 4 measures only the preload from spring 97. This preload is defined and calibrated as zero load. When a force is applied to the seat structural part 15, the sensor obtains this force between housing 2 and mount 1. The housing 2 transmits the force to the sensing disk 4 changing the output of strain-gauge 5.

The sensor is designed in such a way that it is able to operate under lateral and/or angular misalignments of seat structural parts 15, 88. When a combination of lateral force and angular misalignment between the housing 2 and the mount 1 occurs, the sensor complies with them leaving the sensing disk 4 exposed to the vertical load only. The compliance is ensured by two degree of freedom decoupling between the sensing disk 4 and the thrust surface 137 of the piston 123. In addition, the housing 2 has its own compliance due to the bushing 89 design and spring linkage between the housing 2 and the mount 1 (negative output wave spring 36).

The operating range of the sensor depends on preset of the overload protection subassembly (piston 123, support ring 124, preload bolt 125 and spring 97) and the amount of precompression of the spring 97. When the applied force exceeds the amount of preload of the overload spring assembly, it starts to compress and the housing 2, sensing disk 4, ball bearing 43 and slider 46 move downward. If the applied force keeps increasing to exceed a predetermined level, the trap ring 122 abuts the surface 135 of the housing 2 and all further excessive force bypasses the sensing disk 4 and is transmitted directly from the housing 2 through trap ring 122 to the mount 1. The corresponding force at which this occurs is to be considered as the maximum possible load to the sensing element 4. Practically it means that the applied force is split into two components: measurement and bypass. Measurement force is transmitted via housing 2, sensing disk 4, ball bearing 43, slider 46, piston 123, Belleville springs 97, support ring 124 and mount 1 to seat structural part 88. Bypass force is transmitted via housing 2, trap ring 122 and mount 1 to lower structural seat part 88.

Figure 24:
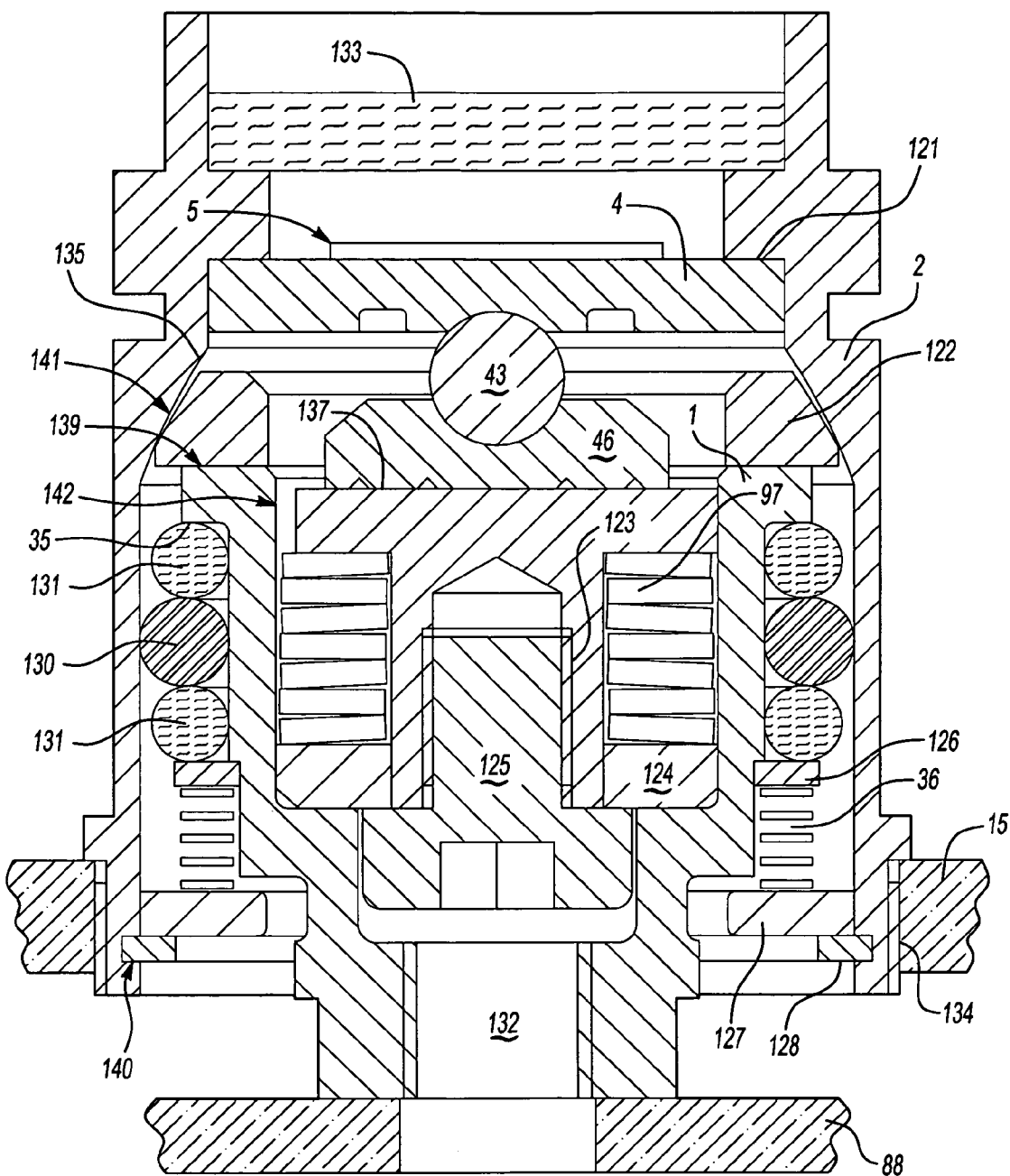
FIG. 24 shows a variation of the load cell of FIG. 23.

A second approach to the bushing design is shown in FIG. 24, which is otherwise similar to the embodiment of FIG. 23. There is a row of steel ball bearings 130 in between two elastic rings 131. A small initial radial clearance of the balls 130 in the annular space between the housing 2 and the mount 1 provides the necessary angular compliance of the housing.

In overload mode either negative or positive one, the housing 2 performs a noticeable linear movement. The steel balls 130 inside the annular slot comply with the movement providing a very low-friction interface between moving parts when the housing 2 rolls along the mount 1. There is no residual frictional hysteresis and no output signal offset when an overload mode has occurred. Apparently, the ball bearings 130 perform a very limited bi-directional rolling movement. Two elastic rings 131 above and below the ball bearings 130 hold them in the proper initial position to roll up or down if it is necessary.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A load cell comprising:
   a first element;
   a second element;
   a saddle disposed between the first element and the second element;
   a convex surface disposed between the first element and the second element;
   at least one spring disposed between the saddle and the first element; and
   a sensor measuring force between the saddle and the second element along a first axis.

2. The load cell of claim 1, wherein the saddle includes a recess engaging the convex surface.

3. The load cell of claim 1, further including a ball bearing having the convex surface.

4. The load cell of claim 1, wherein the at least one spring biases the saddle toward the convex surface, thereby placing a preload on the sensor.

5. The load cell of claim 1, wherein a space between the first element and the saddle limits movement between the first element and the second element along the first axis.

6. The load cell of claim 1, wherein one of the first element and the second element limits movement of the saddle in a direction substantially perpendicular to the first axis.

7. A load cell comprising:
   a first element;
   a second element;
   a saddle disposed between the first element and the second element;
   at least one spring disposed between the saddle and the first element;
   a convex surface disposed between the saddle and the second element; and
   a sensor measuring force between the saddle and the second element along a first axis substantially perpendicular to the first element and the second element.

8. The load cell of claim 7, wherein the saddle includes a recess engaging the convex surface.

9. The load cell of claim 7, further including a ball bearing having the convex surface.

10. The load cell of claim 7, wherein the at least one spring biases the saddle toward the convex surface, thereby placing a preload on the sensor.

11. The load cell of claim 7, wherein a space between the first element and the saddle limits movement between the first element and the second element along the first axis.

12. The load cell of claim 7, wherein one of the first element and the second element limits movement of the saddle in a direction substantially perpendicular to the first axis.

* * * * *

UNITED STATES PATENT AND TRADEMARK OFFICE
CERTIFICATE OF CORRECTION

PATENT NO. : 7,294,793 B2  Page 1 of 1
APPLICATION NO. : 11/363194
DATED : November 13, 2007
INVENTOR(S) : Axakov et al.

It is certified that error appears in the above-identified patent and that said Letters Patent is hereby corrected as shown below:

ON THE TITLE PAGE:

Please insert the following:

(*) Notice: Subject to any disclaimer, the term of this patent is extended or adjusted under 35 U.S.C. 154(b) by 31 days.

--This patent is subject to a terminal disclaimer.--

Signed and Sealed this

Twenty-ninth Day of April, 2008

JON W. DUDAS
*Director of the United States Patent and Trademark Office*